(12) United States Patent
Moore

(10) Patent No.: US 6,310,715 B1
(45) Date of Patent: Oct. 30, 2001

(54) CRYSTAL STACK FOR COHERENT OPTICAL BEAM COMBINATION

(75) Inventor: Gerald T. Moore, Albuquerque, NM (US)

(73) Assignee: The United States of America as represented by the United States Air Force, Washington, DC (US)

( * ) Notice: Subject to any disclaimer, the term of this patent is extended or adjusted under 35 U.S.C. 154(b) by 0 days.

(21) Appl. No.: 09/558,527

(22) Filed: Apr. 26, 2000

(51) Int. Cl.[7] .......................................................... H01S 3/00
(52) U.S. Cl. .................................. 359/334; 372/6; 372/18
(58) Field of Search ..................................... 372/6, 18, 93, 372/25; 359/127, 129, 333, 334, 340, 341.1, 341.2, 341.3, 341.31, 341.32, 341.33, 341.4, 341.41, 341.42, 341.43, 341.44, 341.45, 347, 345

(56) References Cited

U.S. PATENT DOCUMENTS

| 4,752,931 | * | 6/1988 | Dutcher e tal. ........................ 372/18 |
| 5,434,875 | * | 7/1995 | Rieger et al. .......................... 372/25 |
| 5,978,116 | * | 11/1999 | Wu et al. ............................. 359/124 |
| 6,144,677 | * | 11/2000 | Komine et al. ........................ 372/6 |

OTHER PUBLICATIONS

Arisholm, G., "Advanced Numerical Simulation Models for Second–Order Nonlinear Interactions", Proceedings of the SPIE, vol. 3685, p. 86–97, 1999.*
L. Bartelt–Berger, U. Brauch, A. Giesen, H. Huegel, and H. Opower, "Power–scaleable system of phase–locked single–mode diode lasers," Appl. Opt. 38, 5752–5760 (1999).
J. R. Leger, M. L. Scott, and W. B. Veldkamp, "Coherent addition of AlGaAs lasers using microlenses and diffractive coupling," Appl. Phys. Lett. 52, 1771–1773 (1988).
B. Ya. Zeldovich, N. F. Pilipetsky, and V. V. Shkunov, *Principles of Phase Conjugation* (Springer, Berlin, 1985) p. 46.
H. J. Eichler, J. Kunde, and B. Liu, "Quartz fibre phase conjugators with high fidelity and reflectivity, " Opt. Commun. 139, 327–334 (1997).
R. G. Harrison, V. I. Kovalev, W. Lu, and D. Yu, "SBS self–phase conjugation of CW Nd:YAG laser radiation in an optical fibre," Opt. Commun. 163, 208–211 (1999).

(List continued on next page.)

Primary Examiner—Thomas H. Tarcza
Assistant Examiner—Deandra Hughes
(74) Attorney, Agent, or Firm—Kenneth E. Callahan

(57) ABSTRACT

A stack of optically contacted birefringent crystals is configured to carry out coherent beam combination (multiplexing) of narrow-bandwidth phase-locked beams from multiple lasers or laser amplifiers (e.g., multimode Yb-doped fiber amplifiers). A stack of N crystals can multiplex the output of $2^N$ laser amplifiers into a single diffraction-limited beam. Phase control of the beams is maintained by an electronic servo which monitors the optical power emitted into certain undesired beams and minimizes this power by means of phase adjusters (e.g., piezoelectric fiber stretchers) on each amplifier. A configuration is described where a front-end laser master oscillator (FMO) (e.g., a Nd:YAG laser) is demultiplexed by the crystal stack, passes through multiple laser amplifiers, is reflected back through the amplifiers by phase-conjugating mirrors (e.g., passive multimode fibers generating stimulated Brillouin scattering), and is multiplexed on the return trip through the crystal stack. Phase conjugation removes beam distortion and depolarization produced on a single pass through the amplifiers, and the reflected beams are generated with the spatial profiles and alignment needed for beam recombination. An additional back-end laser master oscillator (BMO) (e.g., a second Nd:YAG laser) seeds the phase-conjugate field to phase-lock the different amplifiers.

3 Claims, 3 Drawing Sheets

OTHER PUBLICATIONS

V. I. Kovalev and R. G. Harrison, "Diffraction limited output from a CW Nd:YAG master oscillator/power amplifier with fibre phase conjugate SBS mirror," Opt. Commun. 166, 89–93 (1999).

T. R. Loree, D. E. Watkins, T. M. Johnson, N. A. Kurnit, and R.A. Fisher, "Phase locking two beams by means of seeded Brillouin scattering," Opt. Lett. 12, 178–180 (1987).

R. H. Moyer, M. Valley, and M.C. Cimolino, "Beam combination through stimulated Brillouin scattering," J. Opt. Soc. Am. B 5, 2473–2489 (1988).

* cited by examiner

CRYSTAL STACK FOR COHERENT OPTICAL BEAM COMBINATION

STATEMENT OF GOVERNMENT INTEREST

The invention described herein may be manufactured and used by or for the Government for governmental purposes without the payment of any royalty hereon.

BACKGROUND OF THE INVENTION

1. Field of the Invention

The present invention is in the field of laser multiplexing, and in particular relates to the coherent beam combination of the output of multiple phase-locked optical amplifiers or lasers to produce a high-power diffraction-limited laser source.

2. Description of the Related Art

The peak far-field intensity produced by M phase-locked optical amplifiers or lasers of equal power can ideally be M times as great as the intensity produced by the same sources if their relative phases are random. This fact has motivated a great deal of work on achieving coherently phased optical sources. An example is a device which phases the output of 19 phase-locked diode lasers by sending this light through single-mode optical fibers. [L. Bartelt-Berger, U. Brauch, A. Giesen, H. Huegel, and H. Opower, "Power-scaleable system of phase-locked single-mode diode lasers," Appl. Opt. 38, 5752–5760 (1999).] Piezoelectric transducers are used to stretch the fibers so as to shift the optical phases. The optimal phases are maintained by means of an electronic feedback circuit.

Phase control is only one aspect of the problem of coherent beam combination. Generally the far-field of a phased array of emitters has power distributed partially into side lobes, so that the central peak contains only a fraction of the total power. To some extent this problem can be reduced by the use of microlens arrays which collimate the light from the individual sources when it has diffractively spread almost to the point of overlapping. [J. R. Leger, M. L. Scott, and W. B. Veldkamp, "Coherent addition of AlGaAs lasers using microlenses and diffractive coupling," Appl. Phys. Lett. 52, 1771–1773 (1988).] This increases the filling factor of the array, which is the ratio of the sub-beam diameters at their waists to the distance between beams. A large filling factor results in a greater fraction of far-field power in the central lobe. However, the microlens array does not produce a Gaussian beam, and the beam quality is not diffraction limited.

It is an object of the present invention to produce a high-power polarized Gaussian beam that is diffraction limited by multiplexing narrow-bandwidth phase-locked beams from multiple lasers or laser amplifiers. It is a further object to demultiplex a common optically encoded signal, such as a cable television signal, into multiple optical pathways.

SUMMARY OF THE INVENTION

A configuration of stacked optically contacted birefringent crystal plates has been conceived for the purpose of coherently combining (multiplexing) multiple phase-locked laser beams into a single diffraction-limited beam. Conversely, a beam of light propagating in the reverse direction at normal incidence through a stack consisting of N crystals is split (demultiplexed) into $2^N$ linearly polarized beams. In the direction of multiplexing the thickness of successive crystal plates increases by a factor of $\sqrt{2}$, and the transverse direction of extraordinary-wave walk-off in successive plates flips back and forth by 45°. The relative phases of the $2^N$ beams to be combined must be controlled in order for beam combination to occur. Otherwise the number of emerging beams increases to $[2^{(N+1)/2}-1]^2$ if N is odd and $(2^{N/2}-1)(2^{1+N/2}-1)$ if N is even. By monitoring the power emitted into certain of the unwanted emerging beams and minimizing this power by means of an electronic feedback circuit controlling optical phase adjusters, most of the emerging power can be concentrated into the single desired beam.

The beams to be combined must also have the correct spatial positions and alignment. This is greatly simplified by using a device where these beams are produced by phase-conjugate reflection of a demultiplexed beam from a front-end master oscillator (FMO) which has passed through the stack in the opposite direction. Stimulated Brillouin scattering (SBS) in multimode fibers can produce the required phase conjugation and can reverse the effects of aberrations and depolarization that occur on the forward pass through the device. Laser amplifiers, such as Yb-doped multimode fibers pumped by a diode-laser array, can be used to amplify both the incoming radiation and the reflected Stokes radiation. A back-end laser master oscillator (BMO) at the Stokes frequency can be used to phase-lock the beams emitted by the different amplifiers, and piezoelectric fiber stretchers can be used to adjust the beam phases to achieve multiplexing in the crystal stack.

DETAILED DESCRIPTION

Figure 1:
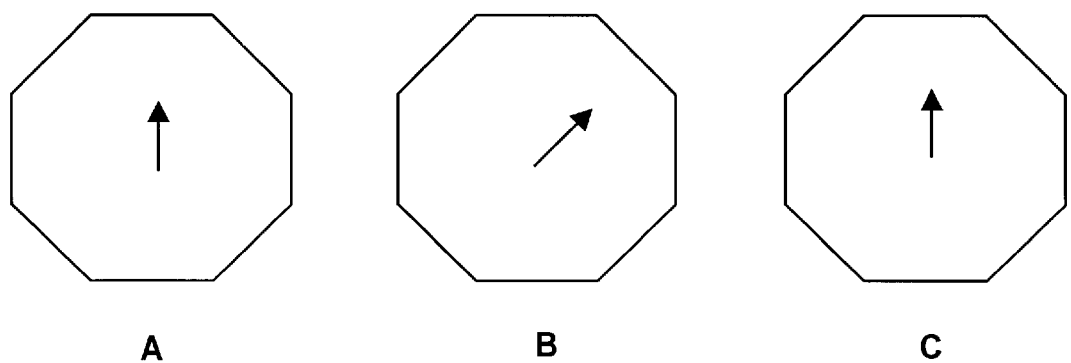
FIG. 1 shows the configuration of three birefringent crystal plates (A, B, C) for multiplexing 8 laser beams.
Figure 1:
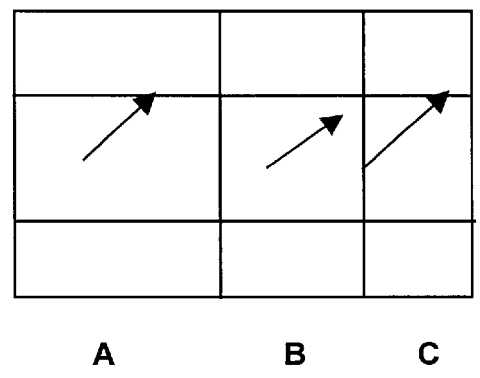

The present invention uses a stack of optically contacted birefringent crystal plates to produce a coherently combined (multiplexed) polarized Gaussian beam that is diffraction limited. A stack of N plates can be used to multiplex $2^N$ linearly polarized beams entering the stack of crystal plates at normal incidence. Light from a single suitably polarized beam entering the stack in the opposite direction is demultiplexed into $2^N$ linearly polarized beams in the time-reversed process. The stack utilizes birefringent walk-off between light beams with ordinary and extraordinary polarization. This well-known effect is called double refraction.

Optical phase conjugation, while not essential to the beam combination technique described here, is useful in conjunction with this technique in order to correct aberrations and depolarization associated with optical amplification or with passage of light through multimode fibers. It also ensures the proper spatial configuration and alignment of the beams to be combined. [B. Ya. Zeldovich, N. F. Pilipetsky, and V. V. Shkunov, *Principles of Phase Conjugation* (Springer, Berlin, 1985) p. 46.] Phase-conjugate reflection by means of stimulated Brillouin scattering (SBS) in multimode optical fibers (≈50 μm core diameter) has been shown to give good fidelity and reflectivity of optical phase conjugation [H. J. Eichler, J. Kunde, and B. Liu, "Quartz fibre phase conjugators with high fidelity and reflectivity," Opt. Commun. 139, 327–334 (1997) and R. G. Harrison, V. I. Kovalev, W. Lu, and D. Yu, "SBS self-phase conjugation of CW Nd:YAG laser radiation in an optical fibre," Opt. Commun. 163, 208–211 (1999).] and to correct the aberrations in a Nd:YAG amplifier, while preserving the linear polarization. [V. I. Kovalev and R. G. Harrison, "Diffraction limited output from a CW Nd:YAG master oscillator/power amplifier with fibre phase conjugate SBS mirror," Opt. Commun. 166, 89–93 (1999).]

The SBS process shifts the reflected radiation to a slightly lower frequency (Stokes frequency) than the incident radiation. The same technique should work if the Nd:YAG amplifier is replaced by a Yb-doped diode-laser-pumped multimode fiber power amplifier (PA) which amplifies light from a suitable front-end master oscillator (FMO), such as a Nd:YAG laser. Moreover, the Yb fiber amplifier would be more efficient than a Nd:YAG amplifier and easier to couple to long (≈1 km) passive multimode fiber for SBS generation. To extend the technique to an array of fiber amplifiers, the FMO light is demultiplexed in the crystal stack, injected into the fiber array, and amplified. The reflected phase-conjugated Stokes radiation is further amplified and is multiplexed on the return trip through the crystal stack. A back-end master oscillator (BMO) operating at the Brillouin Stokes frequency seeds the SBS amplification to phase-lock the different amplifiers. [T. R. Loree, D. E. Watkins, T. M. Johnson, N. A. Kurnit, and R. A. Fisher, "Phase locking two beams by means of seeded Brillouin scattering," Opt. Lett. 12, 178–180 (1987) and R. H. Moyer, M. Valley, and M. C. Cimolino, "Beam combination through stimulated Brillouin scattering," J. Opt. Soc. Am. B 5, 2473–2489 (1988).] This device a called a MOPAMO, since there is a master oscillator (MO) at each end.

The invention uses beam demultiplexing in a stack of birefringent crystals oriented for maximal walk-off of the extraordinary ray. This means that light propagation occurs at approximately 45° with respect to the crystal axis. The configuration is illustrated in FIG. 1 for three birefringent crystal plates shown cut in the shape of octagonal cylinders. This configuration can be used to multiplex 8 laser beams into 1 beam or demultiplex 1 laser beam into 8 beams. The propagation direction is along the cylinder axis. The crystal axis is at approximately 45° to the cylinder axis to maximize walk-off of the extraordinary rays, and successive crystals are rotated back and forth by 45° about the cylinder axis with respect to each other. The length of successive crystals decreases by a factor of $1/\sqrt{2}$ in the demultiplexing direction. On top is an end view of crystals before they are stacked. The bottom shows a side view of the crystal stack. Demultiplexing occurs during propagation from left to right at normal incidence. Multiplexing is the time-reversed process. Arrows indicate the direction of the crystal axis. In a positive ($n_e > n_o$) uniaxial crystal such as rutile, e-ray walk-off is towards the crystal axis (upwards in crystals A and C for demultiplexing).

It is assumed for simplicity that the crystals are uniaxial, but biaxial crystals with propagation perpendicular in all plates to one of the principal dielectric axes could also be used. The direction of walk-off flips back and forth by 45° in successive crystals and the length of successive crystals decreases by a factor of $1/\sqrt{2}$. Light (e.g., from the FMO or the BMO) is normally incident on the stack. If there are N plates in the stack, the light emerges as $2^N$ beams of equal power, each linearly polarized along one of the principal polarization directions of the final plate. These beams are arrayed on a square lattice, but within a parallelogram with 45° angles.

Multiplexing is the time-reversed process. This requires that the $2^N$ beams to be combined be linearly polarized in the appropriate pattern and that the phases of these beams be correctly chosen. The beams must also have the correct spatial profiles and alignment. If the beams to be combined are generated by SBS in multi-mode fibers, the phase-conjugation produced by SBS causes the Stokes beams to be correctly aligned, irrespective of misalignments of the fibers, so long as the incident signals fit within the spatial and angular acceptance of the fibers. The seeding of SBS by the BMO causes the Stokes fields from the different fibers to have the same frequency, so that they can be phase locked. The phase adjustments can be made by stretching the fibers. [Bartelt-Berger] The required phases can be determined by monitoring and minimizing the power of a subset of the unwanted beams of Stokes radiation after passage through the crystal stack.

Figure 2:
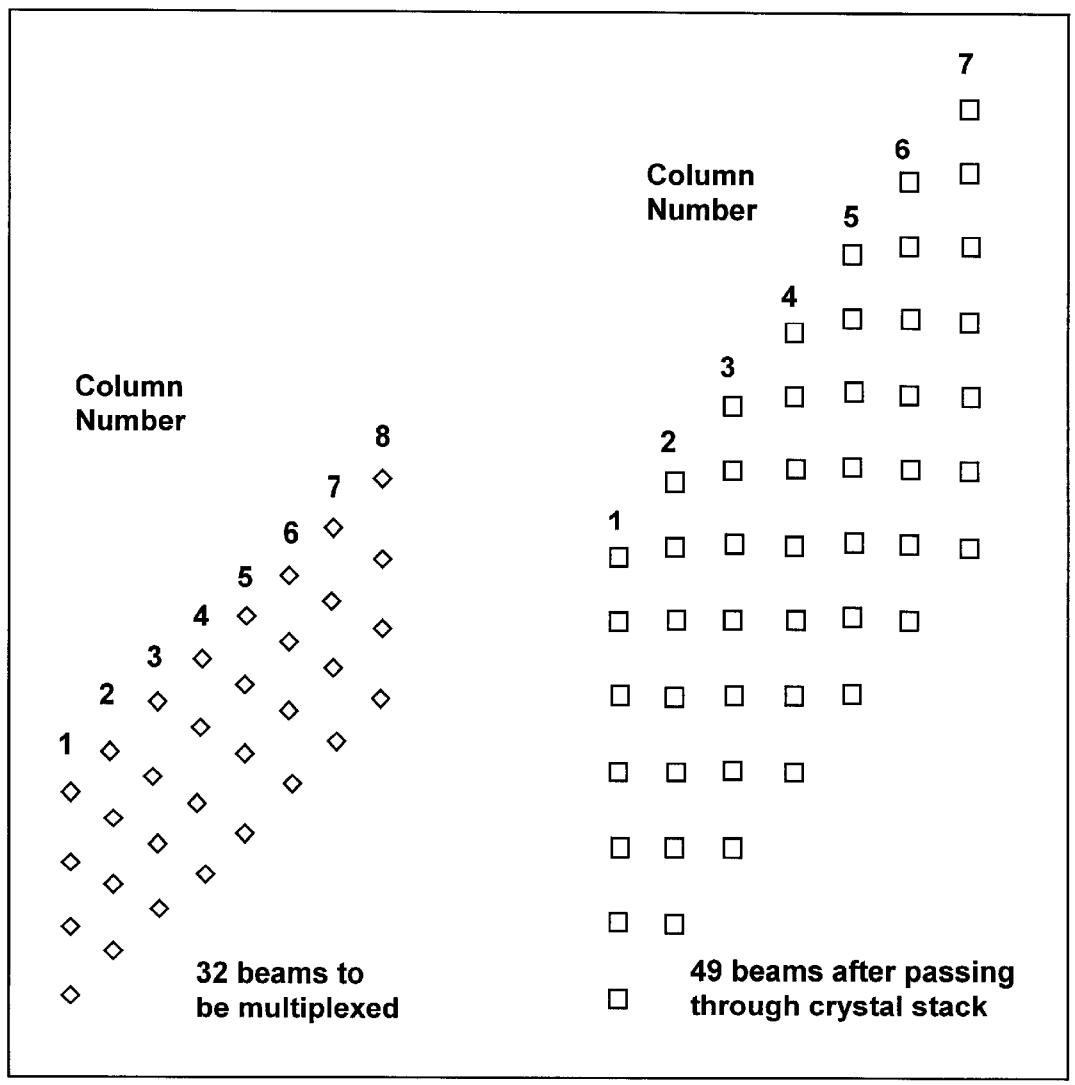
FIG. 2 shows the transverse beam positions for multiplexing 32 beams using a stack of birefringent crystal plates.

For example, a five-layer stack of crystals demultiplexes the FMO light into 32 beams. FIG. 2 shows the transverse beam positions for multiplexing 32 beams using a stack of 5 crystals. The array on the left shows the transverse positions of the 32 beams to be multiplexed. In the first crystal traversed by these beams the odd-numbered columns have e-polarization and the even-numbered columns have o-polarization. In terms of conventional map directions, e-ray walk-off is alternately northeast and north in successive crystals. After passing through the stack, there are 49 beams, arrayed as shown on the right side of the figure. Only the central one (plus symbol) is desired. The unwanted beams (boxes) can largely be eliminated by choosing proper phases for the input beams, using an electronic feedback loop. The algorithm for the phase adjustments monitors the power in the 16 unwanted beams at the vertices of the corner rhombuses on the right, plus the central beams in columns 2 and 6. The plus symbol also marks where the FMO beam enters the crystal stack in the opposite direction. This coincides with the position of the upper right demultiplexed beam in the array on the left. The FMO is polarized to split equally into o- and e-polarization in the first crystal it enters, so that the 32 demultiplexed beams to be amplified and returned to the crystal stack by phase-conjugate reflection receive equal power.

The Stokes light generated by seeded SBS passes back through the stack, generating 49 beams if the phases are random. By monitoring the intensities of 18 of these beams, it has been demonstrated by means of a computer experiment that one can impose the 30 phase constraints needed to recombine most of the Stokes light into a single beam counterpropagating to the FMO light. The other 30 unwanted, but unmonitored, beams are automatically eliminated. By imposing one additional constraint to minimize the light coming out from one port of the Faraday isolator near the FMO, one can concentrate the output into a single linearly polarized beam coming out the other port of the isolator. A common phase shift of the light from all the fibers or phase shifts by multiples of $2\pi$ have no physical effect. However, the fiber elongations should be kept positive but not so large as to damage the fibers. Beam combination works best if the demultiplexed Stokes beams have equal power, but can be efficient even if this is not the case.

If there is significant diffraction within the crystal stack, the beams of emerging Stokes radiation may spread into each other (become out of focus). This makes it hard to resolve the unwanted beams. To a large extent, this problem can be alleviated by splitting off a portion of the output and re-imaging the fiber ends, using a lens or curved mirror. This is not a perfect cure, since the ordinary and extraordinary light diffracts at different rates. Moreover, the extraordinary light diffracts anisotropically. For e-ray propagation at 45° to the optic axis, the refractive index is $n=1/\sqrt{1/2n_o^2+1/2n_e^2}$.

The rates of diffraction are reduced relative to empty space by the factors $1/n_o$ for the ordinary polarization, by $n^2/n_e^2 n_o^2$ for the extraordinary polarization in the plane of the crystal axis, and by $n/n_e^2$ for the extraordinary polarization in the orthogonal transverse direction. Although the demultiplexed beams are all slightly different from one another, the phase-conjugation properties of SBS ensure that the Stokes beams are properly shaped and aligned for beam recombination to occur. This process is insensitive to slight misalignments of the fibers.

The crystals in the multiplexing stack must be highly birefringent and in good optical contact. Calcite is a convenient crystal, since it has a low index of refraction, so that index-matching fluid can be used for contacting different crystals in the stack. However, damage may be a problem in calcite at high power.

Rutile is a prime candidate for high-power operation. At present, 15 mm optical-grade crystals are available. Rutile has a high refractive index ($n_o$=2.477, $n_e$=2.735 at the wavelength $\lambda$=1.064 $\mu$m), so diffraction is small. It has no second-order nonlinearity. For propagation at 45° with respect to the crystal axis, the relative phase advance of o-rays and e-rays propagating through a typical plate thickness of 1 cm varies periodically with frequency with a period of 246 GHz. Since this is much larger than the expected laser bandwidth, the relative phases needed for coherent beam combination in a crystal stack are sharply defined. The best method of optically contacting rutile crystals in a stack is not yet determined, but diffusion bonding is a possibility. Phase conjugation should be helpful in correcting thermally-induced aberrations in the crystal stack, if these aberrations are not so severe as to inhibit injection of light into the fibers. Fresnel reflections at interfaces between crystals in the stack are not a problem; the transmission coefficient is 0.99972. Antireflection coatings are needed for the front and rear surfaces.

An important issue which passive-fiber experiments can help to elucidate is the optimal power level for BMO seeding. This involves a compromise. High SBS gain is needed to obtain good phase conjugation, which means that the seed power needs to be much smaller than the FMO power entering the fiber. On the other hand, the BMO power must be large enough to dominate over unseeded SBS originating from thermal noise. Otherwise, the Stokes output from different fibers is not phase correlated, and the phase locking essential to coherent beam combination is impossible. The use of seeded SBS for beam combination has been studied using pulsed lasers and SBS cells [Loree, Moyer], but has not been studied using CW lasers or multimode fibers. Computer experiments indicate that perfect phase locking is not essential for effective beam combination. For example, if the phases of light of equal power from 32 fibers are chosen randomly within a 90° sector of the optimal values, about 80% of the total power is coupled into a single output beam by using a five-layer crystal stack.

Figure 3:
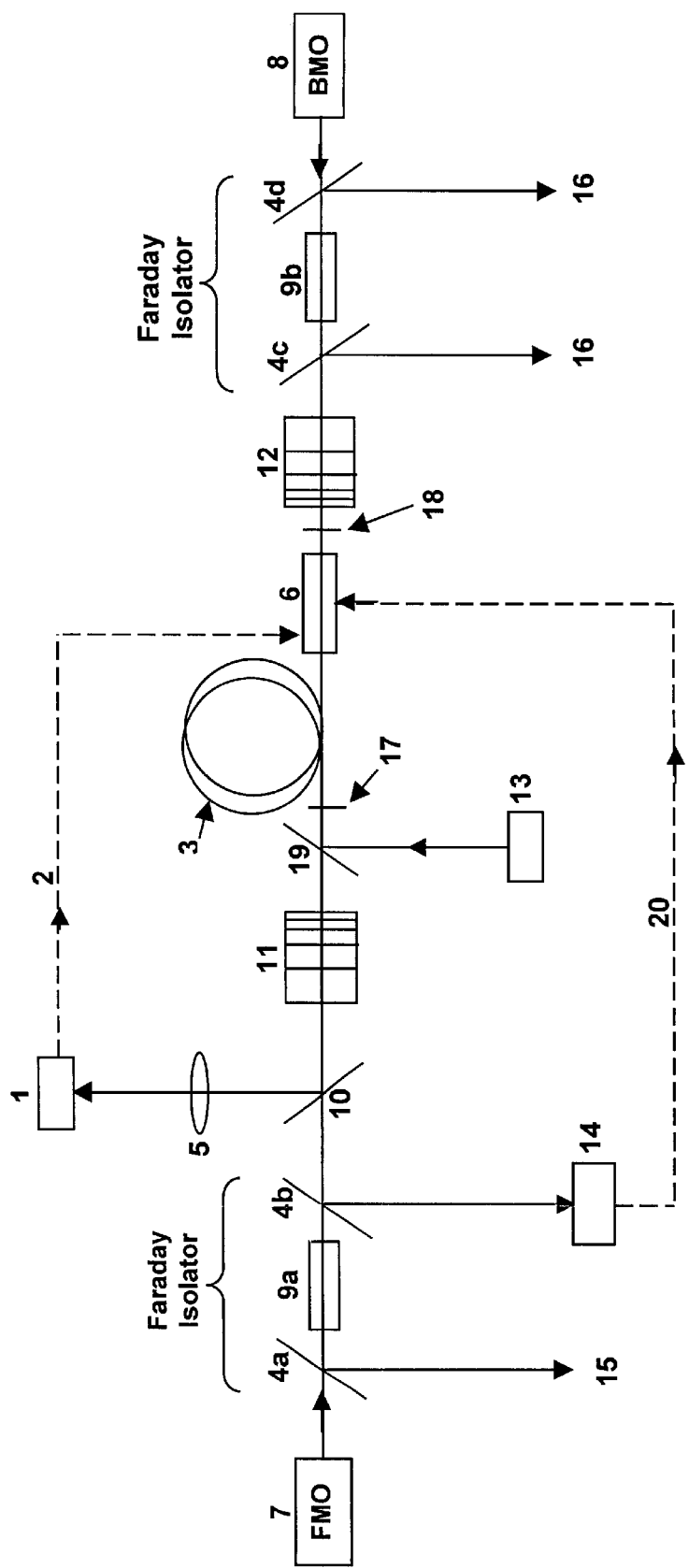
FIG. 3 is a schematic diagram of a device for multiplexing the output of multiple fiber amplifiers.

FIG. 3 shows a schematic diagram of a master oscillator-power amplifier-master oscillator (MOPAMO) for multiplexing the output of multiple fiber amplifiers. The Nd:YAG FMO 7 and BMO 8 beams are injected into opposite ends 17, 18 of the array of multimode fibers 3 after passing through Faraday isolators [consisting of polarizing beam splitters and Faraday rotators 4a 9a 4b at the FMO side and 4c 9b 4d at the BMO side] and crystal-stack demultiplexers 11, 12. The FMO and BMO can either use different crystal stacks as shown, or the fibers could be looped back to use different parts of the aperture of a single stack. The fiber ends 17, 18 are arrayed so that one of the demultiplexed beams enters each of the fibers 3. It may be advantageous to mechanically reduce the fiber cladding diameter near the fiber ends to increase the filling factor of the array. Except near the fiber ends, the fibers can be spatially separated from each other to facilitate removal of waste heat and can be polymer-coated to preserve their mechanical strength. The fibers are in three sections. At the front end is a short section of passive fiber to minimize heat generation where the fibers are arrayed in close proximity 17. Then there is a section ($\approx$2 m) with Yb-doped core which acts as an amplifier of the FMO radiation and the returning Stokes radiation generated by SBS. The amplifiers are pumped by a diode-laser array 13. The glass plate 19 is coated to reflect the pump radiation into the fibers at 17, while transmitting the FMO light. If the array has a large filling factor, the pump radiation need not be aimed at individual fibers, but can be directed at the array as a whole. Other techniques for injecting pump radiation are possible. However, such techniques are not the subject of this invention.

The third fiber section is passive fiber of sufficient length (about 10 m to 1 km depending on the optical power) to cause SBS generation of light traveling back towards 11. SBS is expected to deplete up to about 70% of the forward-traveling light. Light unconverted by SBS emerges in the beams 16. The BMO 8 radiation seeds the SBS generation to phase-lock the different fiber amplifiers, and the amplified Stokes radiation, which is phase conjugate to the FMO light, is multiplexed into a single beam in the crystal stack 11. A CCD detector array 1 in the image plane of the fiber ends after the beam splitter 10 and lens 5 detects emission into undesired beams. This emission is minimized by a feed-back loop 2 to fiber stretchers 6 which adjust the relative phases of light from the different fibers. An additional phase constraint is imposed through the feedback loop 20 to minimize the power measured by detector 14. This causes the multiplexer 11 to generate a nearly diffraction-limited polarized beam emerging at 15.

Optical phase conjugation is proposed as a means of ensuring that the beams to be combined have the correct spatial configuration and alignment needed for multiplexing. Optical phase conjugation can also reverse aberrations and depolarization occurring on the forward pass. SBS in multimode fibers is an example of a process that can generate the desired phase-conjugate reflection. Seeding the SBS Stokes radiation using a demultiplexed BMO can phase-lock the radiation in the different beams. Phase locking is most feasible with laser light with a single frequency or a narrow spectral width. The SBS threshold is also lowest for such light.

Other processes besides SBS are known which generate phase-conjugate reflections. An example is stimulated temperature scattering due to absorption [Zeldovich]. Such processes can also be used for beam combination in conjunction with the crystal stack described herein. If phase conjugation of closely overlapped mutually coherent beams occurs in a bulk medium, beam combination in a crystal stack may be possible without the use of phase adjusters or seeding [Moyer]. However, thermally induced beam distortion at high power is expected to be more severe in bulk media than in fiber arrays.

Amplification of the demultiplexed FMO radiation and further amplification of the reflected Stokes radiation can be carried out in optical amplifiers in order to greatly increase the optical power before the Stokes beams are multiplexed. Yb-doped diode-laser-pumped multimode fiber amplifiers are preferred for amplification of light near 1-$\mu$m wavelength, since such amplifiers are efficient and can be readily coupled to long (≈1-km) passive multimode fibers for SBS generation. Fiber-coupled Nd-YAG lasers could be used, but would be less efficient.

The beam-combination technique described here could be used at other wavelengths besides the 1.064 μm example given here. Amplification and beam multiplexing at 1.5 μm wavelength using Er-doped fiber amplifiers is a potential application.

I claim:

1. An apparatus for producing a high-power amplified output from a narrow bandwidth laser, the apparatus comprising:

a front-end master oscillator (FMO) (7) generating a narrow bandwidth laser beam;

a first Faraday isolator through which said FMO laser beam passes, said first Faraday isolator consisting of a first polarizing beam splitter (4a), a Faraday rotator (9a), and a second polarizing beam splitter (4b);

a first stack of N optically contacted birefringent crystals (11) configured to demultiplex said FMO laser beam outputting $2^N$ laser beams;

an array of $2^N$ multimode fibers (3) with front and back fiber ends, said front fiber ends positioned so that one of the FMO demultiplexed beams enters each front fiber end, said fibers comprised of three sections, a short front end section of passive fiber, a middle section of Yb-doped core acting as a fiber amplifier of said demultiplexed FMO laser beams and the returning Stokes radiation reflected back through said fiber amplifiers by SBS, and a passive fiber section of sufficient length to cause SBS generation of Stokes radiation traveling back through said first crystal stack to thereby be multiplexed into a single amplified beam, said outgoing Stokes radiation being the phase conjugate of the incoming FMO beams;

a diode laser array (13) to pump the fiber amplifiers;

a back-end laser master oscillator (BMO) generating radiation to seed the SBS generation and thereby phase-lock the $2^N$ fiber amplifiers and the amplified Stokes radiation;

a second Faraday isolator through which said BMO beam passes, said second Faraday isolator consisting of a third polarizing beam splitter (4c), a second Faraday rotator (9b), and a fourth polarizing beam splitter (4d), said third and fourth polarizing beam splitters serving to deflect the unreflected portion of the FMO beams (16) passing through said multimode fibers (3);

a second stack of N optically contacted birefringent crystals (12) configured to demultiplex said BMO laser beam outputting $2^N$ BMO laser beams aligned such that one of the BMO demultiplexed beams enters each back fiber end;

a fiber stretcher (6) for each of said $2^N$ multimode fibers (3) located near the back end of said fibers;

a beam splitter (10) to direct a portion of said Stokes radiation into a CCD detector (1) in the image plane of the front fiber ends;

a first feedback loop (2) detecting the emission of undesired beams of Stokes radiation emanating from said first crystal stack and minimizing said undesired beams by controlling fiber stretchers (6) positioned at the back end of said multimode fibers (3);

a second detector (14) to measure the power output of said Stokes radiation;

a second phase constraint feedback loop (20) to minimize the power measured by said second detector (14); and a near diffraction-limited polarized beam of Stokes radiation (15) deflected by said first polarizing beam splitter (4a).

2. The apparatus of claim 1 whereby said multimode fibers are looped back to use a different portion of the aperture of said first crystal stack (11), eliminating the need for said second crystal stack (12).

3. A method for the high-powered amplification of a single front-end master oscillator (FMO) laser beam using fiber amplifiers, the method comprised of:

passing a FMO laser beam through a stack of N optically contacted birefringent crystals (11) configured to demultiplex said FMO laser beam outputting $2^N$ laser beams;

inputting each of said $2^N$ FMO demultiplexed beams into the front ends of $2^N$ multimode fibers;

amplifying each of the FMO demultiplexed beams;

reflecting said FMO demultiplexed beams back through said fiber amplifiers by phase-conjugating mirrors;

monitoring the output power of a plurality of undesired beams and minimizing this power by means of phase adjusters;

phase-locking the $2^N$ fiber amplifiers using a back-end laser master oscillator; and passing said reflected demultiplexed beams back through said stack of N optically contacted birefringent crystals (11) for beam recombination.

* * * * *